Oct. 20, 1942.  W. M. SCHILLING  2,299,597
COMBINATION KNIFE GUARD AND REMINDER BOARD
Filed Dec. 10, 1940
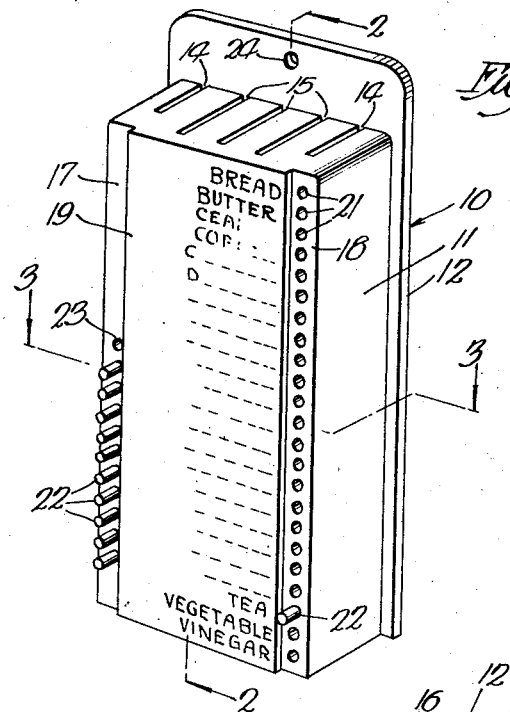
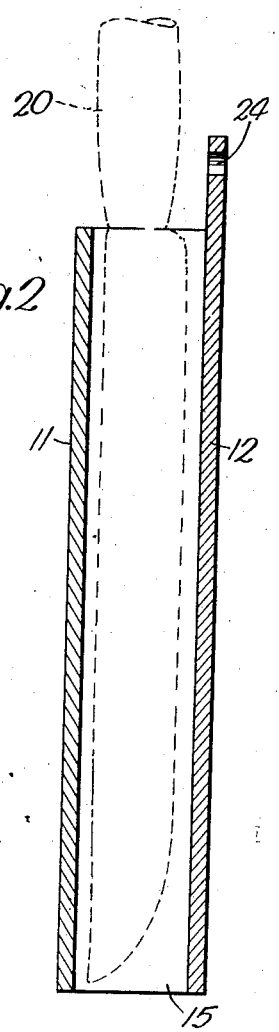
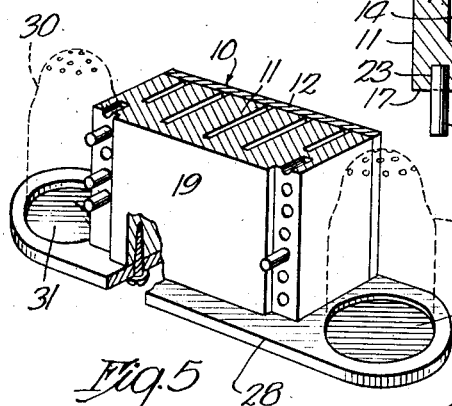
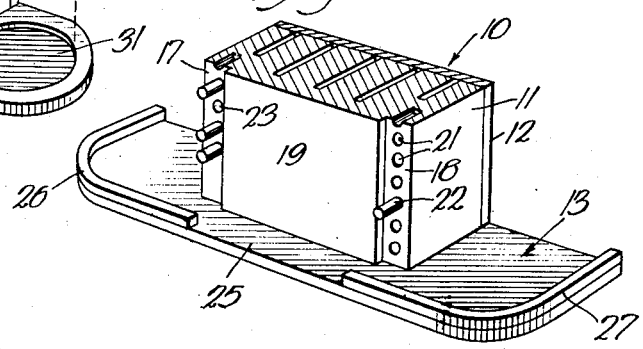
INVENTOR.
William M. Schilling
BY Mann, Brown &c
ATTYS Patented Oct. 20, 1942

2,299,597

UNITED STATES PATENT OFFICE 2,299,597

COMBINATION KNIFE GUARD AND REMINDER BOARD

William M. Schilling, Chicago, Ill.

Application December 10, 1940, Serial No. 369,449

1 Claim. (Cl. 211—60)

The invention relates to kitchen articles and more particularly to a combined knife guard and reminder or memorandum device.

One of the objects of the invention is the provision of a device for indicating current supplies required which is combined with a knife guard.

A further object of the invention is the provision of a block so constructed that it is adapted to hold knives in a safe, convenient position and having the parts so constructed that openings for pins are provided in the face of the block for indicating various items printed on the face of the block.

A still further object of the invention is the provision of a new and improved article for use in the kitchen that is so constructed as to function as a guide for knives; as a reminder for indicating the current supplies required for the kitchen; and as a support for salt and pepper shakers, the whole being concentrated in a minimum of space.

Another object of the invention is the provision of a new and improved kitchen article that is inexpensive to manufacture, easily assembled, composed of but few parts and that is efficient in use.

Other and further objects and advantages of the invention will appear from the following description taken in connection with the accompanying drawing, in which Fig. 1 is a perspective view of the device;

Fig. 2 is a vertical section on the line 2—2 of Fig. 1;

Fig. 3 is a horizontal section on the line 3—3 of Fig. 1;

Fig. 4 is a view similar to Fig. 1 but showing a base on the device; and

Fig. 5 is a view similar to Fig. 4 but showing a modified form of base.

The modern kitchen, especially in apartment buildings, is usually of limited size and hence space is an important feature. Improved devices of various kinds have been introduced in order to save space and add convenience and serviceability to the different articles that are useful in the kitchen. The present invention seeks to provide an article that is not only useful and conveniently arranged but one that occupies a minimum of space and that adds to the artistic effect of the wall on which it is supported.

Referring now to the drawing, the reference character 10 designates the combined knife guard and memorandum device which comprises a block, preferably of wood 11 and a back member 12 rigidly secured thereto. The device may be of composition material or of any other suitable material, wood being preferred because it is easily worked and less expensive to assemble. If desired, the device may be provided with a base plate 13 as shown in Fig. 4 or it may be used without the plate 13 as shown in Fig. 1.

The block 11 is provided with a plurality of kerfs 14 and 15. The kerfs 14 at each side of the block are shallower than the kerfs 15 in the intermediate portion thereof so that space will be provided outwardly of the shallow kerfs 14 for the recesses for receiving the pins as will presently appear.

In the manufacture of the device, the kerfs are first made or sawed in the back of the block and afterwards, the back plate 12 is attached by any suitable means such as glue, cement, screws, tacks, nails, or the like, as indicated at 16 in Fig. 3. The kerfs are provided for receiving the blades of knives 20, Fig. 2, for holding the knives when not in use in a convenient position for instant use when the same are required.

The front face of the block 11 is provided with a longitudinal rabbet at each side as shown at 17 and 18, so that the central portion or face 19 between the rabbets is offset forwardly, as shown in Fig. 3. This forwardly offset face 19 has printed thereon a vertical list of articles in current use in the kitchen and opposite each article in the rabbet 18, suitable openings 21 are provided in which, what for convenience of description may be termed reminder elements, pins or indices 22 may be inserted as a reminder when it is desired to replenish any of the articles enumerated in the list. The rabbet 17 is provided with a plurality of openings 23 which are employed to hold the pins when the same are not in use. Experience has shown that it is not necessary to have as many pins as there are openings 21 because the current requirements are much less than the number of items.

It will be noted that the shallower kerfs 14 are arranged opposite the openings 21. By means of this arrangement, the block may be much thinner than would be necessary if the openings 21 were opposite the longer kerfs 15. Where the openings are shallow the pins will more likely fall out unless they are made to fit tightly and where they make a tight fit they may swell and be too large to enter the openings during damp weather. This arrangement is considered an important feature of the invention because it not only permits the openings 21 to be deeper but permits the opposite side edges of the block to be rabbeted thereby improving the appearance of the same.

The back plate 21 extends above the block and may be provided with a perforation 24 whereby the device may be supported from a nail in the kitchen wall. The back plate extends laterally also a slight distance beyond the sides of the block to add to the appearance of the device. The article may be painted or stained in different colors to harmonize with the color scheme of the kitchen. For instance, the back plate may be red, the block white and the list of articles black, if desired. The articles are sold in various color combinations to suit the taste of the housewife.

Preferably, thought not necessarily, the device 10 is provided with a base plate 25 which is secured to the block 11 by any suitable means such as nails, screws, cement, or the like. The base plate 13 extends laterally and forwardly beyond the surfaces of the block as shown more clearly in Fig. 4 of the drawing. Preferably, the plate extends laterally beyond the side walls of the block sufficient to afford a support for salt and pepper shakers. In order to prevent the shakers from sliding from the plate, curved beads 26 and 27 are attached to the plate and extend above the same to act as guards.

In the form of the construction shown in Fig. 5, the base plate 28 is provided with depressions 29 and 31 which are routed out and are adapted to hold salt and pepper shakers from sliding from said plate.

It is thought from the foregoing, taken in connection with the accompanying drawing, that the construction and operation of my device will be apparent to those skilled in the art and that changes in size, shape, proportion and details of construction may be made without departing from the spirit and scope of the appended claim.

I claim as my invention:

An article of manufacture for use in a kitchen, comprising a block having vertical rabbets on its front face at each side thereof for providing a forwardly offset face between said rabbets for containing a column of names of different food items, a plurality of intermediate comparatively deep kerfs and a shallow kerf at each side thereof provided in the rear face of said block and extending longitudinally thereof, a rigid plate secured to the back of said block across said kerfs and extending above said block for constituting a closure for the open sides of said kerfs and for forming a support for said article, the front face of one of said rabbets being provided with openings opposite the food items for receiving pegs for indicating said items and the front face of the other rabbet having openings therein for receiving pegs held in reserve, said shallow kerfs being behind said openings whereby said openings do not intercept said kerfs and yet are of sufficient depth to hold said pegs without unnecessarily increasing the thickness of said block.

WILLIAM M. SCHILLING.